United States Patent
Kline et al.

(10) Patent No.: US 10,719,713 B2
(45) Date of Patent: Jul. 21, 2020

(54) SUGGESTED COMMENT DETERMINATION FOR A COMMUNICATION SESSION BASED ON IMAGE FEATURE EXTRACTION

(71) Applicant: INTERNATIONAL BUSINESS MACHINES CORPORATION, Armonk, NY (US)

(72) Inventors: Eric V. Kline, Rochester, MN (US); Sarbajit K. Rakshit, Kolkata (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 141 days.

(21) Appl. No.: 15/991,096

(22) Filed: May 29, 2018

(65) Prior Publication Data

US 2019/0370556 A1 Dec. 5, 2019

(51) Int. Cl.
- *G06K 9/00* (2006.01)
- *G06Q 50/00* (2012.01)
- *G06N 20/00* (2019.01)

(52) U.S. Cl.
CPC ..... *G06K 9/00744* (2013.01); *G06K 9/00302* (2013.01); *G06N 20/00* (2019.01); *G06Q 50/01* (2013.01)

(58) Field of Classification Search
CPC .......... G06K 9/00744; G06K 9/00302; G06N 20/00; G06Q 50/01
See application file for complete search history.

(56) References Cited

U.S. PATENT DOCUMENTS

| | | | |
|---|---|---|---|
| 5,676,138 A | 10/1997 | Zawilinski | |
| 6,353,810 B1 | 3/2002 | Petrushin | |
| 9,019,174 B2 | 4/2015 | Jerauld | |
| 9,826,001 B2* | 11/2017 | Farrell | ......... H04L 65/403 |
| 2006/0129405 A1 | 6/2006 | Elfanbaum | |

(Continued)

OTHER PUBLICATIONS

Kanjo, E., et al., "Emotions in context: examining pervasive affective sensing systems, applications, and analyses." Personal and Ubiquitous Computing, Oct. 2015, vol. 19, Issue 7, pp. 1197-1212.

(Continued)

*Primary Examiner* — Amara Abdi
(74) *Attorney, Agent, or Firm* — Tihon Poltavets; Matthew M. Hulihan; Heslin Rothenberg Farley & Mesiti PC

(57) ABSTRACT

A process identifies participants in a communication session, the participants including a first user and a second user. The process analyzes digital images of a scene and extracts image features relating to the second user. The process accesses a classification of past digital communications involving the second user and to which the second user has reacted with positive sentiment, and determines comment(s) to which the second user is expected to react with positive sentiment if provided by the first user. The comment(s) are determined based on correlating the image features to the classification of past digital communications to which the second user has reacted with positive sentiment. The comment(s) are then provided, during the real-time communication session and as suggestions for the first user to make to the second user, for overlay on a display through which the first user views the scene including the second user.

20 Claims, 9 Drawing Sheets

(56) References Cited

U.S. PATENT DOCUMENTS

| | | | | |
|---|---|---|---|---|
| 2012/0179751 | A1* | 7/2012 | Ahn | G06Q 30/0282 |
| | | | | 709/204 |
| 2013/0044130 | A1 | 2/2013 | Geisner et al. | |
| 2013/0095460 | A1* | 4/2013 | Bishop | G09B 5/06 |
| | | | | 434/308 |
| 2014/0149177 | A1 | 5/2014 | Frank et al. | |
| 2014/0247343 | A1* | 9/2014 | Chen | G02B 27/017 |
| | | | | 348/135 |
| 2014/0337254 | A1* | 11/2014 | Chen | G06Q 10/101 |
| | | | | 706/12 |
| 2015/0339287 | A1* | 11/2015 | Bastide | H04L 51/02 |
| | | | | 704/9 |

OTHER PUBLICATIONS

A. Grandey, "Emotion Regulation in the Workplace: A New Way to Conceptualize Emotional Labor," Journal of Occupational Health Psychology. 2000, vol. 5, No. 1, pp. 95-110.

Isbister, K., et al., "Helper agent: designing an assistant for human-human interaction in a virtual meeting space." In Proc. SIGCHI conf. on Human Factors in Computing Systems (CHI '00). ACM, 2000, pp. 57-64.

IBM, "An emotion broker to convey contextual information to enhance communications." IP.com Disclosure No. IPCOM000182883D, Original Publication Date: May 8, 2009, 4 pgs.

Anonymous, "Enhanced Meeting (Conference Call) Experience Using Measured Sensory Characteristics of Participants." IP.com Disclosure No. IPCOM000207674D, Pub. Date: Jun. 9, 2011, 6 pgs.

Anonymous, "Emotion analysis in live chat sessions." IP.com Disclosure No. IPCOM000243071D, Publication Date: Sep. 11, 2015, 4 pgs.

Sunayama, W., et al., "Continuation Support of Conversation by Recommending Next Topics Relating to a Present Topic," 2016 5th IIAI Intl Congr Adv. Applied Informatics (IIAI-AAI), Kumamoto, 2016, pp. 168-172.

McGhee, P., "Humor Improves Communication", [retrieved on May 4, 2018]. Retrieved from the Internet URL: <http://www.laughterremedy.com/articles/communication.html>, 7 pgs.

MacKay, H., "In Business and Life, a Sense of Humor Helps", [retrieved on May 4, 2018]. Retrieved from the Internet URL: <http://www.startribune.com/in-business-and-life-a-sense-of-humor-helps/374331251/>, Apr. 3, 2016, 2 pgs.

Seyedyuosf seyednezad Jeludara, et al., "The study of relationship between sense of humor and general health in students", Procedia—Social and Behavioral Sciences 30 (2011), pp. 2057-2060.

McNamara, C., "Guidelines to Conducting Effective Meetings", [retrieved on May 4, 2018]. Retrieved from the Internet URL: <https://managementhelp.org/misc/meeting-management.htm>, 8 pgs.

"Writing a Meaningful Letter of Recommendation", [retrieved on May 25, 2018]. Retrieved from the Internet URL: <https://www.scribd.com/document/251902937/Writing-a-Meaningful-Letter-of-Recommendation>, Concordia University of Montreal, School of Graduate Studies, 5 pgs.

* cited by examiner

US 10,719,713 B2

SUGGESTED COMMENT DETERMINATION FOR A COMMUNICATION SESSION BASED ON IMAGE FEATURE EXTRACTION

BACKGROUND

Communications between participants during an online meeting or other real-time communication such as a video call, are an everyday occurrence. A compliment or affirmation from one participant to another participant containing positive sentiment can allow for a progression of discussion during such communications. However, a compliment or affirmation in one scenario may be inappropriate in another scenario and can hinder the progression of discussion between the participants of the online meeting or other real-time communication. As a result, a topic change with positive intensions can at times affect the progression of the discussion between participants and rather than producing the intended positive sentiment, can produce a negative sentiment among the participants.

SUMMARY

Shortcomings of the prior art are overcome and additional advantages are provided through the provision of a computer-implemented method. The method identifies participants in a real-time communication session, the participants including a first user and a second user. The method also analyzes digital images of a scene viewable to the first user during the real-time communication session, and extracts image features from the digital images of the scene based on the analyzing. The digital images of the scene depict the second user during the real-time communication session and the extracted image features relates to the second user. The method accesses a classification of past social media interactions involving the second user and to which the second user has reacted positively. The method determines, for one or more image features of the extracted image features, one or more comments to which the second user is expected to react positively if made by the first user to the second user. The one or more comments are determined based on correlating the one or more image features to the classification of past social media interactions to which the second user has reacted positively. The method also provides, during the real-time communication session, the one or more comments as suggestions for the first user to make to the second user. The one or more comments are provided for overlay on a display through which the first user views the scene including the second user.

Further, a computer program product including a computer readable storage medium readable by a processing circuit and storing instructions for execution by the processing circuit is provided for performing a method. The method identifies participants in a real-time communication session, the participants including a first user and a second user. The method also analyzes digital images of a scene viewable to the first user during the real-time communication session, and extracts image features from the digital images of the scene based on the analyzing. The digital images of the scene depict the second user during the real-time communication session and the extracted image features relates to the second user. The method accesses a classification of past social media interactions involving the second user and to which the second user has reacted positively. The method determines, for one or more image features of the extracted image features, one or more comments to which the second user is expected to react positively if made by the first user to the second user. The one or more comments are determined based on correlating the one or more image features to the classification of past social media interactions to which the second user has reacted positively. The method also provides, during the real-time communication session, the one or more comments as suggestions for the first user to make to the second user. The one or more comments are provided for overlay on a display through which the first user views the scene including the second user.

Yet further, a computer system is provided that includes a memory and a processor in communication with the memory, wherein the computer system is configured to perform a method. The method identifies participants in a real-time communication session, the participants including a first user and a second user. The method also analyzes digital images of a scene viewable to the first user during the real-time communication session, and extracts image features from the digital images of the scene based on the analyzing. The digital images of the scene depict the second user during the real-time communication session and the extracted image features relates to the second user. The method accesses a classification of past social media interactions involving the second user and to which the second user has reacted positively. The method determines, for one or more image features of the extracted image features, one or more comments to which the second user is expected to react positively if made by the first user to the second user. The one or more comments are determined based on correlating the one or more image features to the classification of past social media interactions to which the second user has reacted positively. The method also provides, during the real-time communication session, the one or more comments as suggestions for the first user to make to the second user. The one or more comments are provided for overlay on a display through which the first user views the scene including the second user.

Additional features and advantages are realized through the concepts described herein.

BRIEF DESCRIPTION OF THE DRAWINGS

Aspects described herein are particularly pointed out and distinctly claimed as examples in the claims at the conclusion of the specification. The foregoing and other objects, features, and advantages of the invention are apparent from the following detailed description taken in conjunction with the accompanying drawings in which:

DETAILED DESCRIPTION

Figure 1:
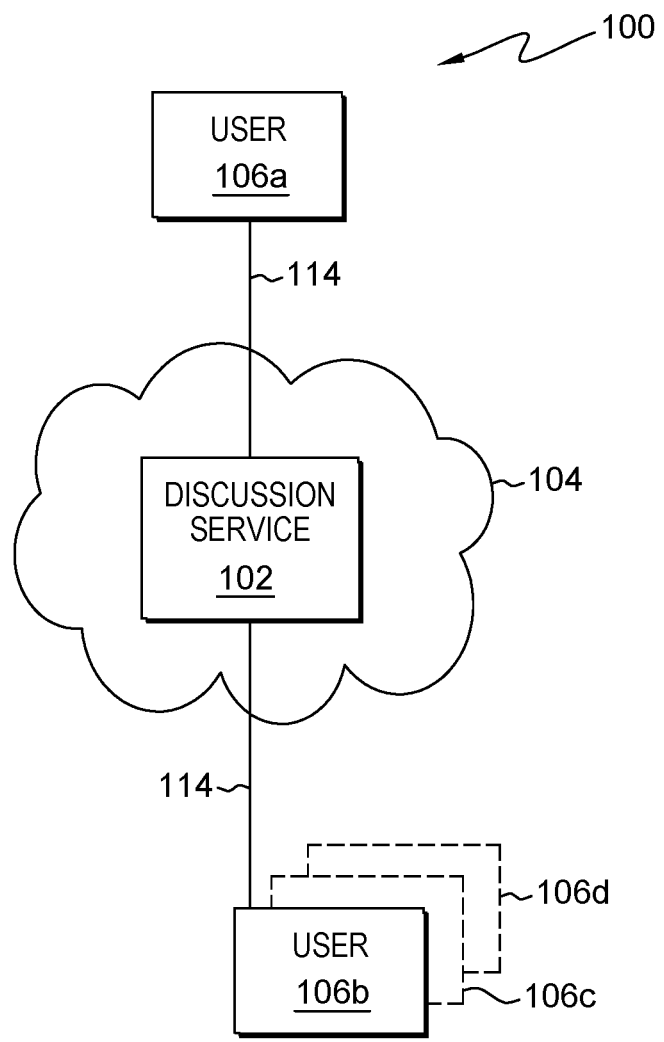
FIG. 1 depicts an example environment to incorporate and use aspects described herein.

Described herein are approaches for building and leveraging, during an online or other real-time communication discussion between participants, a cognitive system to determine and suggest comments to participants for possible presentation during the discussion. The cognitive system evaluates and make recommendations based on how individuals are expected to respond to those comments. The cognitive system can recommend various topics, affirmations, or other types of comments during the discussion, the recommended comments expected be positively received by the user targeted for those comments. An example of a positive reception is bettering the mood of the target user, for instance making the target user feel happy.

By way of specific example, an individual is engaged in a video call with other participants, is determined to be wearing a particular brand of shirt, and has a history of responding particularly well to compliments on social media about the brand of the individual's clothing choices. A discussion topic recommendation in the form of a comment can be made to another participant, the discussion topic recommendation being a recommendation to offer a particular comment about the individual's shirt (for instance "The shirt you are wearing is very fashionable"). Existing practices fail to recommend discussion comments that are intended to make any communication session emotionally interesting and effective.

In some aspects described herein, an emotional profile is created for each user as a function of environmental variables. The profile is made available, for instance as metadata, transferrable data structures, or as an exposed API, to other discussion participants and is used to determine recommended comments or other discussion points that are expected to be emotionally well-received and evoke positive reactions from other discussion participant(s). Such comments are determined based on context and current situational awareness of the discussion (who is involved, the topic(s) discussed, etc.). A user profile can provide model(s) built and trained to understand how the profiled user will react in any of different contexts involving different topics, comments, or the like.

In a particular embodiment, social network content of users is analyzed. Based on the analysis of this historical/past social network content (posts, discussions, comments, chats, likes, recommendations, etc.), software of a content analysis server identifies the types of comments or other interactions that make a subject user feel given emotion(s) (pleased, happy, sad, angry, etc.). In addition, the analysis identifies the individuals involved in the interactions (who receives the comment, who makes the comment), and identifies specific vocabulary that makes the target individual feel the various different emotions. For instance, the analysis might identify that comments from family or social media friends/connections complimenting the user about a garment that the user is wearing are very positively received, whereas similar or identical comments made to the user by an unknown or non-friend individual receive a negative reaction from the user, for instance because they make the user feel awkward or uncomfortable.

User reactions to comments are in some embodiments ascertained from the way the user responds in the social media context, for instance what content the user posts in response or whether the user cuts off the interaction altogether, as examples. It is often possible to ascertain a user's sentiment from the user's posts.

The profile can therefore provide a classification of these media interactions involving different users and the types of comments to which the user has reacted positively. As described in further detail herein, the user can be imaged during a live communication session for instance a video chat. Features from those images showing the user may be correlated to the classification of these past social media interactions and used to identify comments relating to those features and that, if delivered to the user by someone else, are likely to cause a positive reaction from the user.

Software installed on a first participating user's device, or on a remote device, can analyzes image(s) of the participating users to extract image features from the images. This is done during an online video chat (call, conference, meeting, conversation, etc.) or other real-time communication session. The real-time communication session could be a face-to-face interaction between users, at least one of whom wear a head-mounted wearable mobile device that captures images and displays suggested comments on a corresponding display screen of the device.

The extracted image features can be used in determining particular comments to suggest for another participant to make to the target user. The suggested comments determined from the features can be provided to display screen(s) of the other users as suggestions for the other user(s) to make during the discussion in order to evoke a positive reaction from the target user. As an example, a determined comment may be "The tie you are wearing is awesome!". This may be suggested to a first user as a comment the first user might make to a second (target) user if it is expected, based on an analysis of how the target user reacts to social media comments about the target user's fashion, that the comment will be particularly well-received by the second user.

In this example, the comment "The tie you are wearing is awesome!" is likely, and unsurprisingly, positive regardless who the target user is. However, determined comments may include more subtle affirmations that aren't as obviously positive to different users. For instance, a comment "The design of your earring is very rare and unique" may evoke a neutral reaction from most individuals but an uncharacteristically positive reaction from a person who has a passion for collectible antique jewelry. The reaction that person may have to that comment might be particularly positive, especially if made by someone who the target user would not expect to know the target user that well.

The topic, vocabulary, tone, etc. of determined comments may be derived based at least in part on contextual analysis of recent activity, posts, accomplishments, recognitions, etc. about the target user as gleaned from social media. Software can also identify an extent to which a user may already have received praise for this particular aspect on social media. If a subject user recently posted or was recognized in social media about a job promotion but received little praise from social media friends, the system might recommend that a user participating with the subject user in an online chat recognize the accomplishment by saying, typing, or otherwise injecting an appropriate comment into the discussion about the subject user's promotion. Conversely, if social media interactions between the user and others suggests topic(s) or the like that are likely to cause a negative reaction from the user, other users participating in a discussion with that user may be informed of this and advised to avoid these topic(s) in the discussion. These so called 'negative comments' could alternatively or additionally be provided to participants to advise as to comments or topics to avoid.

In some examples, the real-time communication session is a face-to-face discussion and at least some participant(s) interact via a head-mounted wearable mobile device. A participant with such a device has in his or her line of sight a transparent display on which augmented reality or other graphical elements may be displayed. Recommended comment(s) for a participant to make to a target user may be presented on the transparent display as an overlay to the participant's view of the scene, the scene including the target user.

Recommended comments, including appropriate vocabulary, may be presented in a sequence deemed appropriate for the target individual. The sequence can be time-based, order-based, or the like, and can be based on the target user's mood and/or reactions to those comments as they are presented. Thus, during a discussion, software could identify that the target user appears nervous or unhappy and therefore recommend appropriate content to another user for that other user to raise during the discussion to make that target user feel more relaxed or happy. The sequence of comments may be adjusted accordingly. For instance, it may be appropriate, in light of the target's mood, to make a comment that places the target at ease before another comment telling the target a joke. Additionally, or alternatively, software can recommend jokes or points of humor when the discussion is found to be monotonous and/or participating members appear to be feeling uncomfortable. Thus, comments may be suggested based on their qualities of relieving tension, as an example.

A comment presented to a user as a visual element on the user's display may be injected into the discussion by any appropriate manner. For instance, the user might click on or otherwise select a comment presented on the user's display to cause the comment to be placed into a text chat between the participants. Alternatively, the comment may be verbally expressed by the user to the target, and the user could then dismiss the comment from the screen by selecting or swiping the visual element. Alternatively or additionally, the system could use voice recognition to determine that the comment was verbally made, and dismiss or remove the comment from the user's display, as examples.

In instances where the real-time communication session involves several participants, the process can be performed to suggest comments to provide to each of the different participants. During such a multi-party discussion, comments recommended for each of the different users can be displayed proximate each such user's face in the commenting user's display. In this manner, the commenting user can understand what comment(s) are suggested for which other participants.

FIG. 1 depicts an example environment 100 to incorporate and use aspects described herein. Environment 100 includes a discussion service 102 providing facilities for users to interact with each other via a video chat service. Any of various discussion platforms may be used, and in some examples, discussion service 102 is incorporated into another service, such as a social network offering. The discussion service 102 is hosted in a cloud environment 104 or other network infrastructure, for instance on host server(s) thereof represented by 102. Users 106a-106d communicate with the discussion service, e.g. via computer systems represented by 106a-106d that connect to the internet or other network to access the discussion service. As an example, a user uses a computer device of the environment 100 to interact with one or more other users via the discussion service 102, for instance to engage in a video conference. A user device may have client software installed that enables the user of the device to interact with the discussion service and other users thereof. In some examples, the discussion client is a web browser, in which the user navigates to a website and engages with the discussion service (a forum, social media network, etc.) via that website. In other examples, the discussion client on a user device is a mobile application ("app") or other specialized application installed on the client device.

The components in FIG. 1 form wired or wireless network(s) of devices, and communication between the devices takes place via wired or wireless communications links 114 for communicating data between the devices. FIG. 1 is just one example of an environment to incorporate and use aspects described herein; many other examples are possible and contemplated as being compatible with the capabilities described herein.

Figure 2:
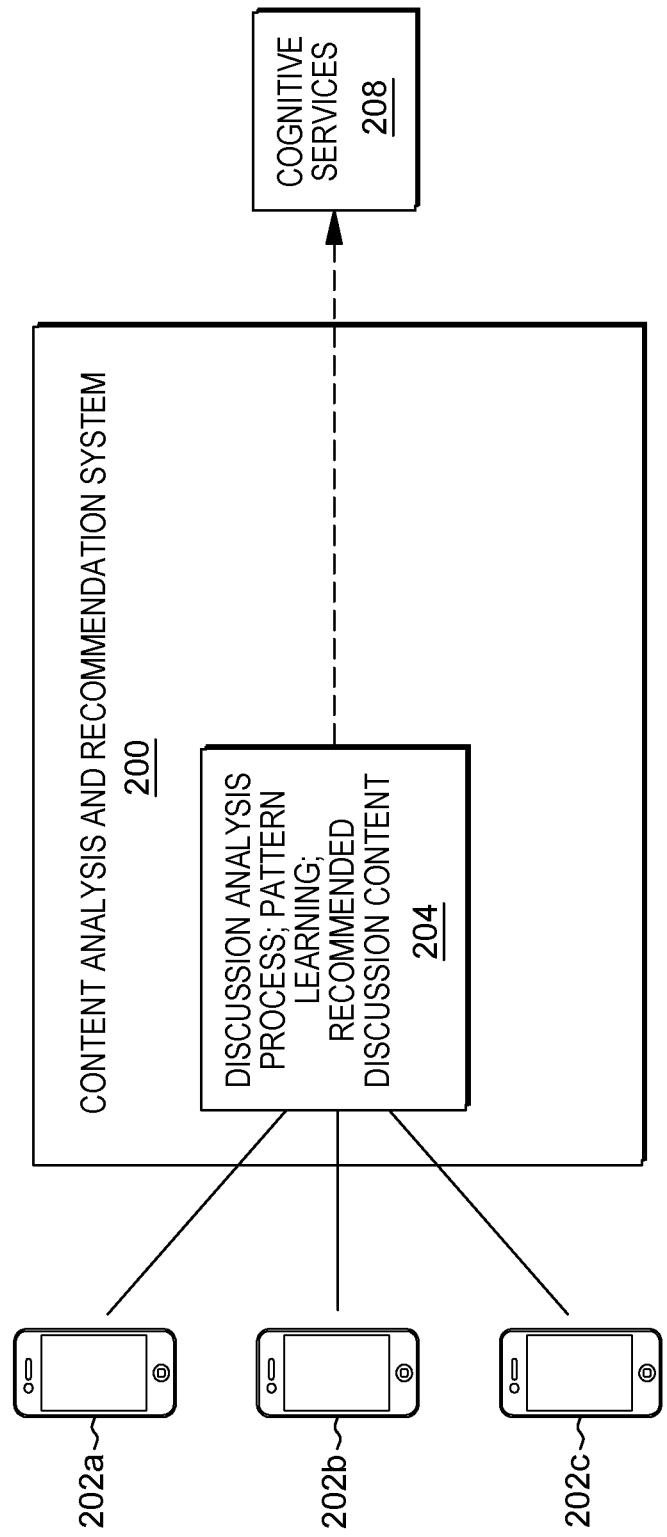
FIG. 2 depicts another example environment to incorporate and use aspects described herein.

FIG. 2 depicts a more detailed example organization of system components in another environment to incorporate and use aspects described herein. Central to this is a content analysis and recommendation system (CARS) 200. This may be implemented purely as software, or a combination of hardware and software, for instance as server(s) separate from or the same as those of the discussion service 102, in some examples. In particular, the CARS may be implemented as an additional module incorporated within or interfacing a discussion service/platform, such as the back-end of a chat or other messaging program. In the example of FIG. 2, users 202a through 202c, represented by mobile devices in the figure, engage in social media interactions via posts, messages, comments, likes, and so forth that are analyzed by the CARS 200. It is noted that the CARS 200 may not be the social media platform(s) with which and through which the users interact. Instead, in embodiments, the CARS monitors user social network activity either through the social networks or by monitoring the user's interaction with his/her device to ascertain the posts and other interactions the user is making in a social media app or other means of accessing the social networks.

The CARS 200 leverages module(s) 204 for discussion analysis processing, pattern learning, and recommending discussion content. Discussion analysis analyzes discussions and other interactions between users. Pattern learning identifies patterns of communication indicating characteristics of interactions and users' responses included in those interactions. Cognitive or other machine learning services (which may be leveraged via calls to separately-provided cognitive services 208 in this example) can analyze interactions for various purposes, for instance to identify which users interact, relations between those users, the topics of those interactions, vocabulary and tone of the interactions, and the nature of comments being exchanged (appreciatory, congratulatory, disagreement, support, agreement, etc.). The analysis also learns how users respond to various messages in various contexts, and learns how a person is likely to respond to hypothetical comments if he/she was presented to the person.

In addition, and based on the above, component 204 analyzes an ongoing communication session and determines comments to recommend that a user make to another participating user (a target user). The determined comments may stem from image features extracted from images taken of target user during the session. The discussion topics, content or other comments may be recommended to a user with the expectation that the comments/content draw a positive reaction from the target.

Thus, a pattern learning process ascertains patterns of communication of users, analyzes responses and develops a user profile for each user. A user profile classifies social media interactions according to any of various characteristics, and can be used to identify how the user is expected to respond to any given comment if presented to the user. This user profile may be updated over time as more social media interactions of the user are observed, analyzed, and fed into the learning process. In this way, the system continually learns how the user reacts, and therefore can be expected to react in the future, to comments presented by various individuals and in varying contexts.

Figure 3:
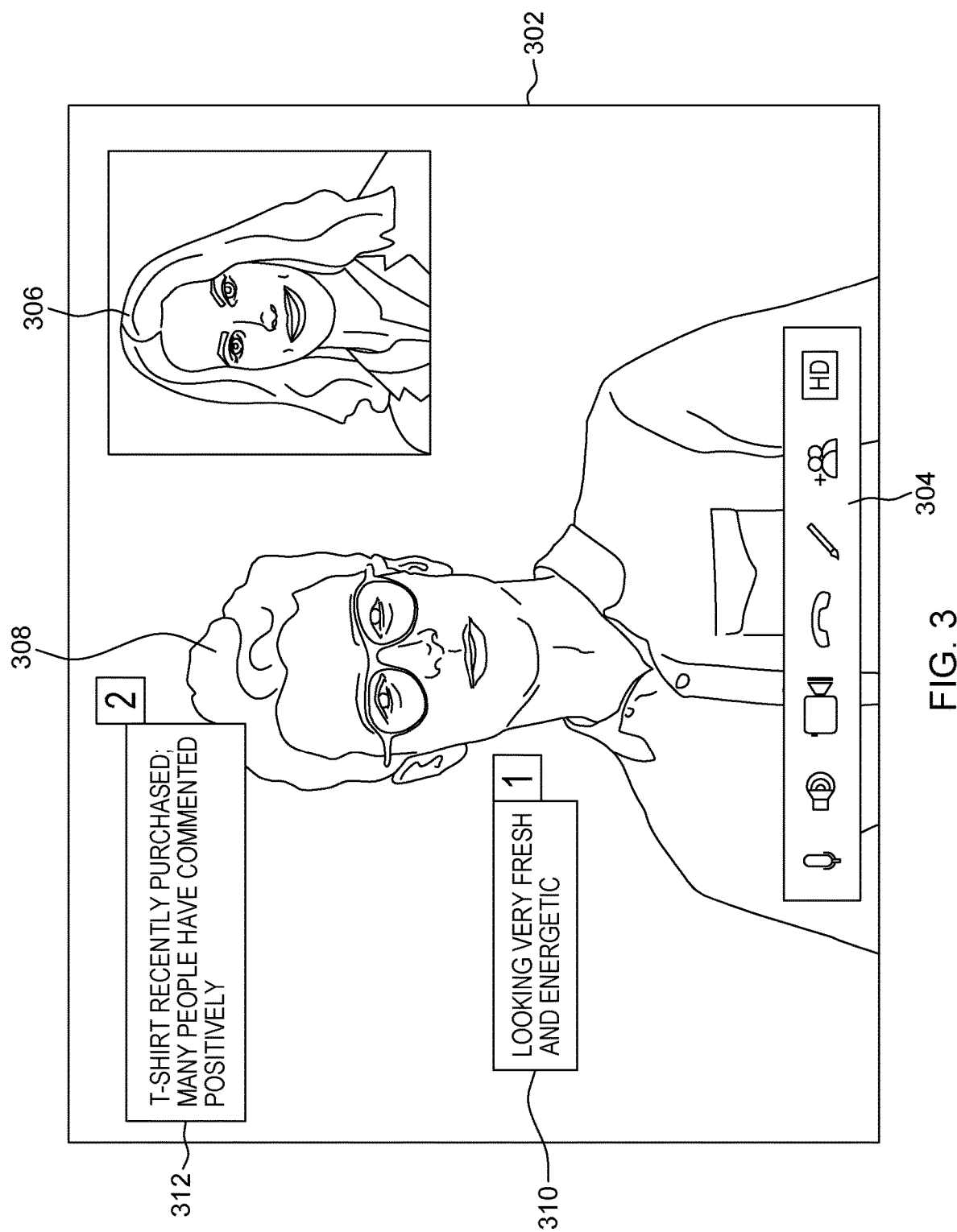
FIG. 3 depicts an example interface of a user device during a real-time communication session, the interface presenting suggested comments for a communication session participant, in accordance with aspects described herein.

To illustrate the recommendation of comments, FIG. 3 depicts an example interface of a user device during a real-time communication session, the interface presenting suggested comments for a communication session participant, in accordance with aspects described herein. In this example, the interface 302 is shown on user A's device. In this case, the communication session is a video chat between user A 308 and user B 306. The interface 302 predominantly shows user B 308 as a participant in the video chat with user A 306 (shown in the top corner) with video controls 304 providing controls for enablement of microphone, sound, camera, editing, participant/contact additions, and video quality, in this example. Users A and B are engaged in a video call. User A's device analyzes (or reaches out to a backend to perform analysis on) captured images depicting the scene in which user B is presented. Thus, for example, the analysis is performed on the images of the video feed of the scene depicting user B 308. The analysis extracts visual features from the images. User A's device also gathers (or reaches out to a backend that gathers) social media content of user B and identifies which of the extracted image features may serve as appropriate seeds for comments that user A might make to user B in order to draw a positive reaction from user B. The recommend comments are shown in two overlays 310 and 312 of user A's interface to inform user A of the recommended comments/topics. Here, comment 310 indicates that user B is looking very fresh and energetic, and recommends that user A point this out to user B. Comment 312 informs that user B's shirt was recently purchased and people on social media have been commenting positively about the shirt. This provides a recommendation to user A that user A also comment positively about user B's shirt. In addition, the comments may be shown using ordinals (1 and 2) conveying a sequence in which they should be made in order to draw a most positive reaction from user B. The recommendation in FIG. 3 is for user A to comment that user B looks fresh and energetic before complimenting user B on his shirt.

In this example the comments are placed into the user interface of user A's device. In other examples, the participants are in face-to-face communication but leverage local mobile devices for aspects described above. Comments may be overlaid in an augmented reality fashion on a transparent display in the line of sight of user A wearing a wearable mobile device, for instance. In yet other examples, the comments are placed in a chat window or other communication program (email, text, etc.) for sending to the target.

Figure 4:
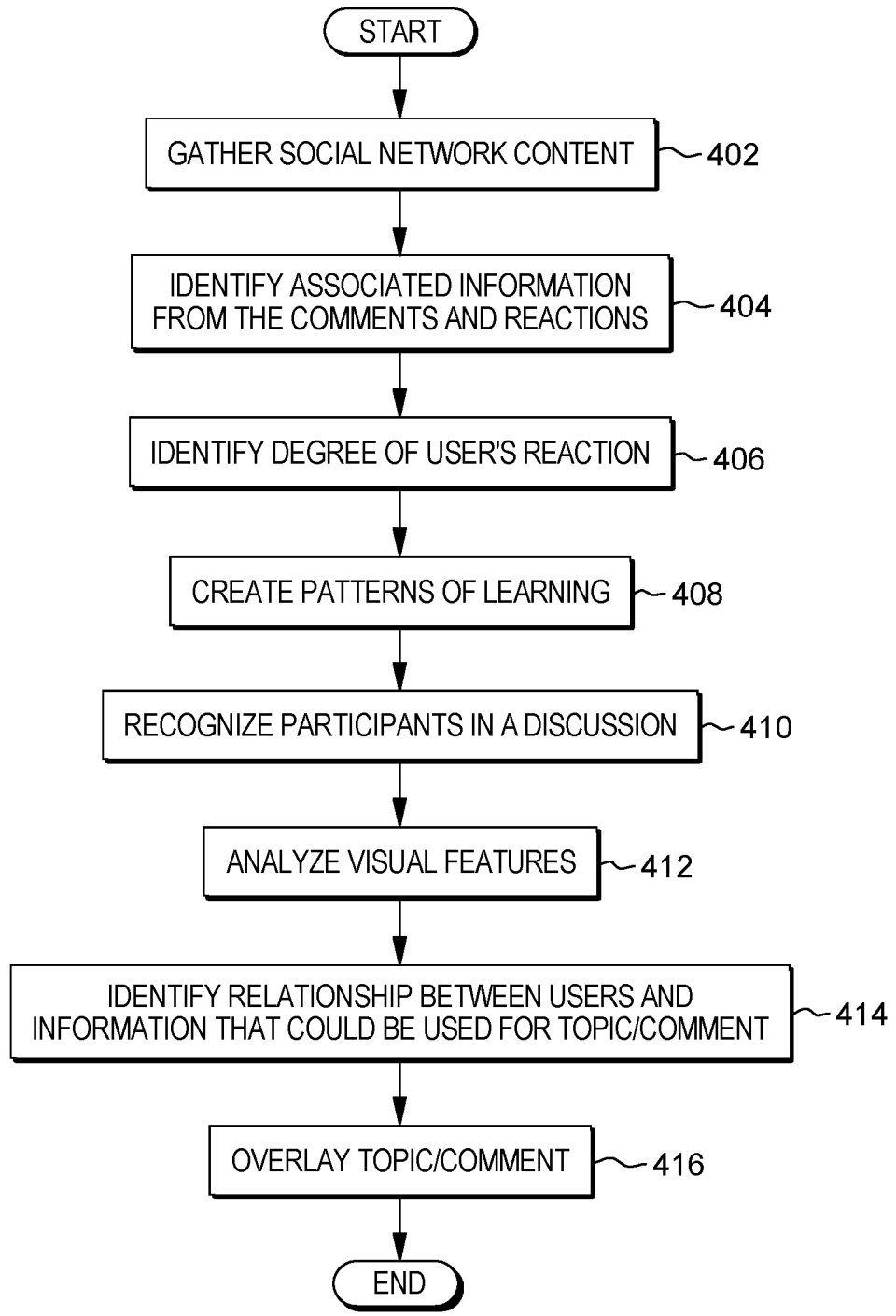
FIG. 4 depicts an example process for suggesting discussion content, in accordance with aspects described herein.

FIG. 4 depicts an example process for suggesting discussion content, in accordance with aspects described herein. The process is performed by software of one or more computer systems, for instance user device(s), backend server(s), or a combination of the two, as examples. The method gathers social network content (402) of each of several users to find how each user reacts to different comments made in interactions involving that user. They may be comments directed at the user, about the user, or any other comments, posts, or other social media content. In one example, contextual analysis software performs this aspect.

The method identifies associated information from the comments and the reactions to those comments (404). Associated information is any information about the context and/or characteristics of the interactions, for instance who makes what comments, the relations between people interacting with each other, topics of the comments (e.g. relating to a photograph of a target user, relating to items belonging to the target user, accomplishments of the target user, etc.), and type or nature of the comments (e.g. appreciatory, congratulatory, disagreement, support, agreement, etc.), as examples.

Based on a user's reaction, for instance a reply comment, software identifies the degree of the target user's reaction, for instance a degree of the change in mental/emotional state of the user (406). An example reaction is that the user was very pleased, moderately pleased, slightly pleased, annoyed, or severely angered, as examples. Contextual analysis can be applied of the target user's responding comment, for instance, to identify the degree of the user's reaction.

Machine learning is applied to create learned patterns (408) that consider the above factors to identify how a user would react to given comments or topics if raised by another person. The learning trains a model to identify how the person might react, and can use that to suggest comments that are expected to draw a positive reaction from the target, for instance because it pleases the target person, makes them happy, lightens their mood, or the like. The model may be sensitive to not only who the target user is and what the comment is but also who makes the comment, the timing of the comment, for instance relative to the target user's mood, vocabulary of the comment, who else is involved in the communication (e.g. it is a group chat), and other contextual parameters.

The above aspects can be leveraged during a real-time communication session, including in a group (2 or more) communication by software installed on user devices, such as personal computers, laptops, or mobile devices including smartphones, tablets, and wearable devices. Thus, the method proceeds by recognizing parties participating in a discussion (410). The recognition may be made in any desired manner, for instance by capturing images of the participants shown on a user interface or using a camera to capture a scene in front of a user and identify who the user is talking to, as examples. The identification is performed in real-time during the communication session in order to identify participants and make suggestions of comments for a user to raise during that discussion.

The method analyzes visual features (412) of the participants and the scenes in which they sit in order to extract image features (specific objects, places, surrounding objects, etc. and whether/how those features relate to each participating member). These features may inform topic(s) about which a user (commenting user) might comment to another user (a target user). The method therefore proceeds by identifying the relationship(s) between the target user and information that could be used to a topic or comment for the commenting user to inject into the discussion (414). As an enhancement, the method might also identify specific topics or comments to avoid, for instance when the analysis described above identifies topics that it expects to cause a negative reaction from the target user. The target user profile or component thereof may be accessed for suggested comments determined based on the profile and features that were extracted from the images.

Software can then overlay suggested comment(s) on an interface that the commenting user sees (416). Overlaying in the user's interface discretely provides the comments to the commenting user. The provision of the comments may be unknown to the target user. This can enhance the effectiveness of the comment if made by the commenting user on the basis that the target user is unaware that the comment was fed to the commenting user automatically.

In group chats, the process can be performed for each of the participants, meaning suggested comments are developed for each participant and fed to any or all other participants. In a given participant's interface, comments may be provided next to each other participant's face so it is clear which comments are suggested for which participants.

In some examples, the method ranks a plurality of suggested comments based on a predicted efficacy in changing the target user's mood. Comments that are expected to draw the biggest positive reaction may be ranked highest, for instance. Or, to avoid the appearance of overzealous flattery, suggested comments may be ranked in increasing order of efficacy so that more subtle affirmations are provided initially and the user's mood and reaction is gauged to determine whether more aggressive praise is appropriate. In this regard, the suggested comments may be provided in a given sequence, series, or order in which they are to be presented to the user. This sequence can change (to add, delete, modify, rearrange, etc. the sequence) based on the changes in discussion content, mood of participants, progress of the discussion, and so on.

Figure 5A:
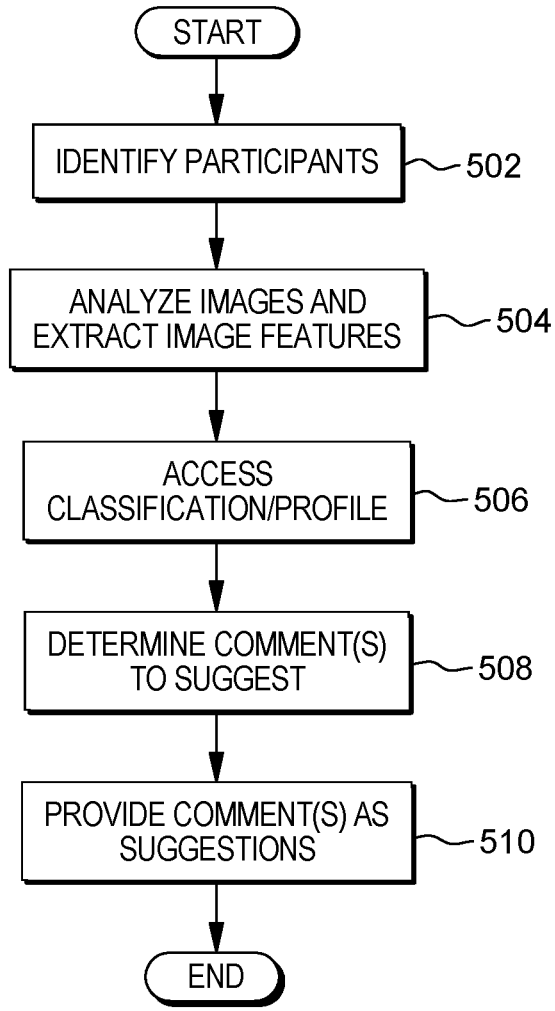
FIGS. 5A-5B depict example processes for determining and suggesting comments during a real-time communication session, in accordance with aspects described herein.
Figure 5B:
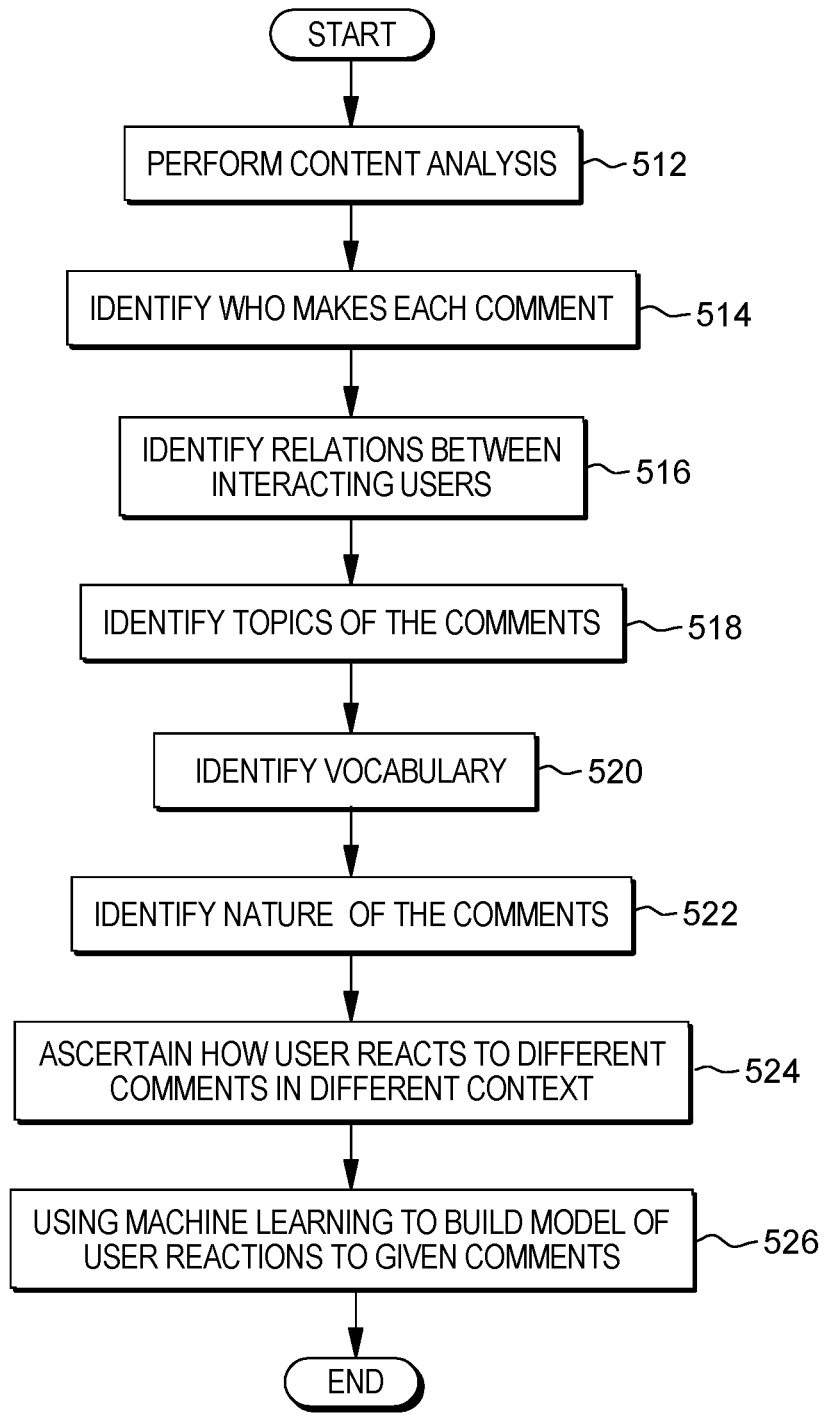

FIGS. 5A-5B depict example processes for determining and suggesting comments during a real-time communication session, in accordance with aspects described herein. In some examples, processes or individual aspects thereof are performed by one or more computer systems, such as those described herein, which may include one or more user computer systems with which they interact to engage in video communications, one or more cloud servers, and/or one of more other computer systems.

Specifically, FIG. 5A depicts an example process for determining and providing comments as suggestions for a user to make to another user during a communication session. The process of FIG. 5A is performed by a server (e.g. 200 of FIG. 2) to which individual client computer devices (e.g. 202a-202c) connect, by the individual client computer devices themselves, or a combination of the two, in which individual steps or aspects may be performed by server(s)/client(s) individually or collectively.

The process begins by identifying participants in a real-time communication session (502). The participants including any number of users, and include a first user (a user to which the determined comment(s) are provided as suggested to make) and a second user (a user targeted as a recipient/audience of those comment(s). Participants can be identified in any desired manner, for instance using facial recognition technology on acquired images, or by examining a list of the participants as maintained by the communication software.

The method continues by analyzing digital images of a scene viewable to the first user during the real-time communication session, and extracting image features from the images of the scene based on the analyzing (504). The images of the scene depict the second user during the real-time communication session and the extracted image features relate to the second user. Image features refer to any features gleaned from the image, for instance moods ascertained from the faces or mannerisms of participants, characteristics of objects appearing on, with, or around participants, markers of geographic location(s) of the participants, current weather, or any other features that are visually observable. The analyzing can therefore identify specific objects depicted in the scene and/or specific places depicted in the scene. The analyzing can also identify how those specific objects and/or specific places relate to the second user. For example, if an image feature is an orange shirt, the relation to the second user may be that the second user is wearing the orange shirt or is inspecting the orange shirt on a sales rack, as examples. If the feature is a famous landmark in the background of the scene, the user's relation may be that the user is at the same geographic location as the landmark.

The method accesses a user profile or component thereof (for instance a classification of past social media interactions involving the second user and to which the second user has reacted positively) (506), serving as a profile about the target user's reactions to different comments in different contexts. In one example, the profile/classification is stored locally on the first user's device, for instance it was cached locally based on determining that the first user is or will be engaged in a discussion with the second user. Additionally or alternatively, the profile/classification is stored on a remote device and fetched on-demand to the client. In yet another example, the access to the profile/classification is made by way of the first user's device sending a request to a remote device (e.g. via an API), the request having an indication of the extracted image features and identity of the first user, for instance, and receiving a response from the remote device. This may be desired in the event that aspects of FIG. 5A are provided as a service to client devices, and a user profile/classification is not to be disseminated to clients.

The method determines comments to suggest (508), for instance determines, for one or more image features of the extracted image features, one or more comments to which the second user is expected to react positively if made by the first user to the second user. The comment(s) may be determined based on correlating the one or more image features to the classification of past social media interactions to which the second user has reacted positively. This can inform comments that will be received positively by the second user. The comments may be automatically generated as part of the determining and/or may be presented as hypothetical comments (from a database for example) to be evaluated for the reaction they would draw.

The method additionally provides, during the real-time communication session, the comment(s) as suggestions for the first user to make to the second user (510), i.e. for overlay on a display through which the first user views the scene including the second user. The providing in this sense could mean sending to the first user's device or making available the comments for the first user's device to fetch. Additionally or alternatively, for instance in the event that the first user's device, as opposed to a remote server, determines the comment(s), the providing means the first user's device providing the comment(s) on the display of the first device.

FIG. 5B depicts an example process for building a user profile of user reactions that the user has in response to interactions with other users, in accordance with aspects described herein. The building is based on content analysis of the user's social network content, and the interactions are between that user and other users within one or more social networks, in the example of FIG. 5B. The user profile provides the classification of past social media interactions to which the user has reacted positively (see 506). The method is performed by one or more computer system(s), for instance by a content analysis and recommendation system of FIG. 2 or a client device 202a, as examples.

The method initially performs content analysis on a user's social network content (512). From this, the method identifies contextual parameters of the content. For instance, the method identifies, for the interactions between the user and the other users within the social network(s), who makes each comment (which comments of the interactions are made by which of the other users) (514), relations between interacting users (relations the user has with the other users making the comments) (516), topics of each of the comments (518), vocabulary of each of the comments (520), and the nature of each of the comments (522). The method also ascertains how the user reacted to these different comments in the different contexts (524). For instance, it ascertains the reactions of the user to the interactions based on responses or other reactions posted by the user in response to the interactions. Particular reactions (positive, negative, and the degree or intensity of those reactions) to given comments inform that those comments or similar comments may evoke similar reactions in the future.

The process applies machine learning and builds a model that identifies how a positive reaction of the second user may be obtained from comments in different contexts, including different topic contexts and from different individuals (526). The learning learns how characteristics of other users (relationship, tone used, etc.) who interact with the subject user are likely to affect whether a specific comment by a specific user evokes a positive reaction from the subject user. In one example, a model built using machine learning serves as the profile or a component thereof (for instance the classifier of positive reactions for the given user). In other examples, the user profile stores user-specific parameters that the model uses in determining the comments and/or expected reactions thereto.

The model may take various parameters, for instance a classification of an image feature, a target user, a list of other users participating with the target user in a conversation, and any other appropriate parameters. The model may build and output suggested comments that it expects to generate a positive reaction. Additionally or alternatively, the model may take proposed comments/topics and output a prediction of how the target is expected to react to each such proposed comment/topic. These are just examples; any appropriate model may be built and leveraged to accomplish aspects described herein.

In specific embodiments, the method of FIG. 5A also includes identifying the one or more image features, of the extracted image features, in one or more social media posts of or about the second user and made within a past timeframe, for instance within the past week or past 6 months. The determined comment(s) could refer to a topic of those social media post(s). This emphasizes a timeliness element in the suggested comments. By way of specific example, an image feature may be the identification of an orange shirt the target user is wearing during the video chat. The method could identify from social media that the target user purchased the shirt on Tuesday, received praise from friends, and expressed a liking for that praise. A suggested comment in this example might be "That looks like a new shirt; It looks very nice on you now".

The one or more comments can include a plurality of comments. The method of FIG. 5A can further include ranking that plurality of comments, for instance according to a predicted strength of positive reaction expected by the second user to each of the plurality of comments. Provision of those comments to the first user can identify that ranking of the plurality of comments to the first user. Additionally or alternatively, the method provides the plurality of comments in a sequence which the first user is to follow in making the plurality of comments to the second user. This sequence may be subject to updating based on, for instance, a flow of discussion of the real-time communication. Updating in this sense can include adding a comment to the sequence, removing a comment from the sequence, and/or rearranging comments within the sequence, as examples.

A timing of the provision (510 of FIG. 5A) of the comments can be determined based on an ascertained mood of the second user and/or a discussion flow of the real-time communication session.

The real-time communication session may be an online video chat (call, conference, meeting, conversation, etc.), though it need not be. For instance, the real-time communication session may be a face-to-face discussion. However, in any case, user personal devices may be leveraged to obtain the images for analysis and extraction of image features and for delivering suggested comments to be made by participants of the discussion. In a particular example, the first user uses a wearable mobile device comprising (sch as a head-mounted wearable device) that includes a camera that obtains the images of the scene and a display, the display being a transparent display disposed in a line of sight of the first user. The line of sight can be from the first user to the second user depicted in the images of the scene. In this scenario, the comments can be provided for displaying on the display of the wearable mobile device as augmented reality elements in the line of sight of the first user.

As noted, various aspects of the methods described herein may be performed by any of various computer systems. In some examples, machine learning and social media network content analysis is performed by a cloud facility or other backend servers with generally very capable processing power in comparison to user/consumer devices, such as mobile devices, laptops, or "desktops". The individual user devices can reach out to the backend for any one or more aspects of the processing described in FIGS. 4, 5A, and 5B. In other examples, for instance if individual user devices have enough computing power to efficiently perform social media network content analysis and machine learning, processing of FIGS. 4, 5A, and 5B could be performed wholly by a single user device or in a distributed manner among user devices of the participants, as an example.

Aspects described herein provide improvements in, inter alia, device-assisted communications and collaboration between users, for instance online video collaboration, by leveraging image feature extraction during a communication session and correlating extracted image features to social network interactions between users. This dynamically informs topics, comments, and discussion points for possible injection into the communications.

Although various examples are provided, variations are possible without departing from a spirit of the claimed aspects.

Figure 6:
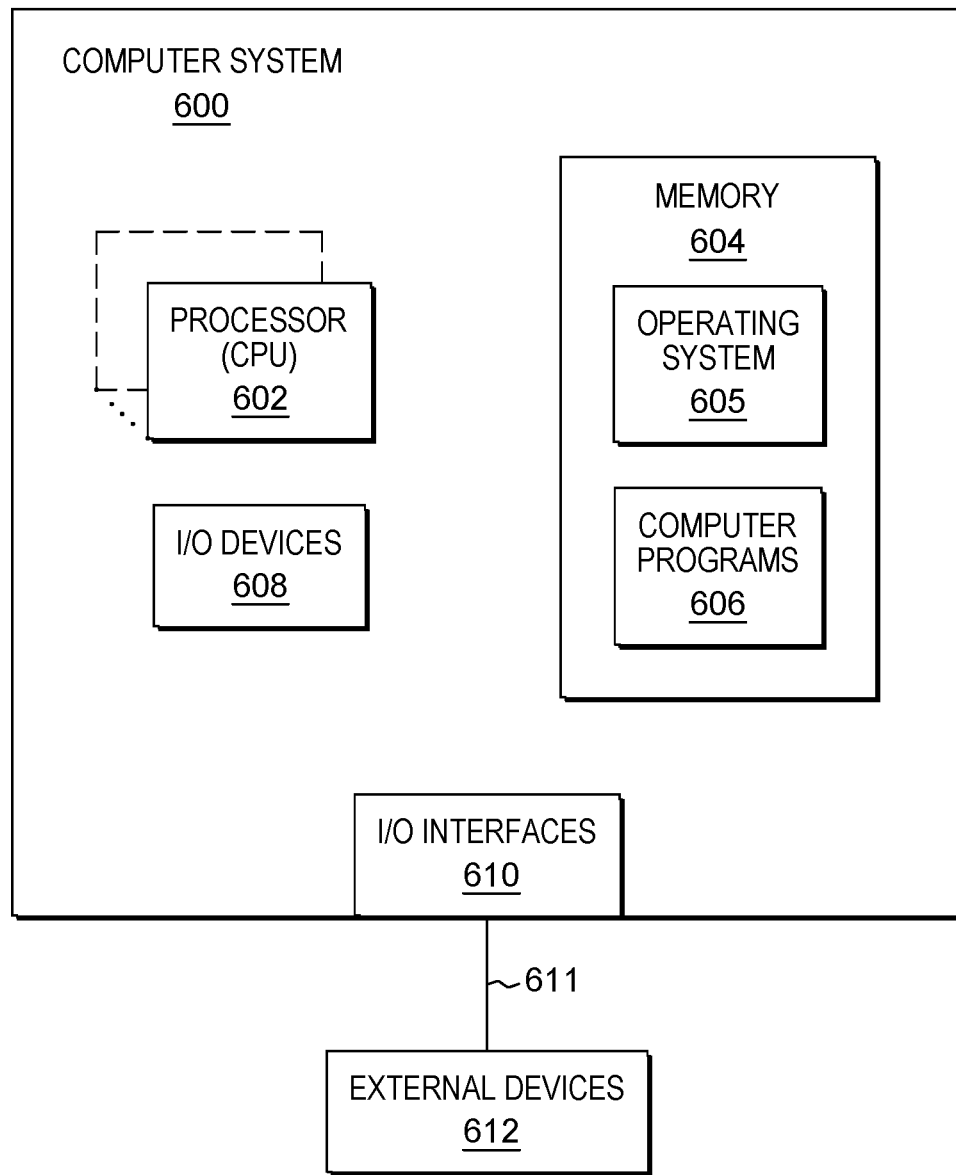
FIG. 6 depicts one example of a computer system and associated devices to incorporate and/or use aspects described herein.

Processes described herein may be performed singly or collectively by one or more computer systems, such as one or more content analysis and recommendation system servers, participating user devices, or a combination of the foregoing, as examples. FIG. 6 depicts one example of such a computer system and associated devices to incorporate and/or use aspects described herein. A computer system may also be referred to herein as a data processing device/system, computing device/system/node, or simply a computer. The computer system may be based on one or more of various system architectures and/or instruction set architectures, such as those offered by International Business Machines Corporation (Armonk, N.Y., USA), Intel Corporation (Santa Clara, Calif., USA) or ARM Holdings plc (Cambridge, England, United Kingdom), as examples.

FIG. 6 shows a computer system 600 in communication with external device(s) 612. Computer system 600 includes one or more processor(s) 602, for instance central processing unit(s) (CPUs). A processor can include functional components used in the execution of instructions, such as functional components to fetch program instructions from locations such as cache or main memory, decode program instructions, and execute program instructions, access memory for instruction execution, and write results of the executed instructions. A processor 602 can also include register(s) to be used by one or more of the functional components. Computer system 600 also includes memory 604, input/output (I/O) devices 608, and I/O interfaces 610, which may be coupled to processor(s) 602 and each other via one or more buses and/or other connections. Bus connections represent one or more of any of several types of bus structures, including a memory bus or memory controller, a peripheral bus, an accelerated graphics port, and a processor or local bus using any of a variety of bus architectures. By way of example, and not limitation, such architectures include the Industry Standard Architecture (ISA), the Micro Channel Architecture (MCA), the Enhanced ISA (EISA), the Video Electronics Standards Association (VESA) local bus, and the Peripheral Component Interconnect (PCI).

Memory 604 can be or include main or system memory (e.g. Random Access Memory) used in the execution of program instructions, storage device(s) such as hard drive(s), flash media, or optical media as examples, and/or cache memory, as examples. Memory 604 can include, for instance, a cache, such as a shared cache, which may be coupled to local caches (examples include L1 cache, L2 cache, etc.) of processor(s) 602. Additionally, memory 604 may be or include at least one computer program product having a set (e.g., at least one) of program modules, instructions, code or the like that is/are configured to carry out functions of embodiments described herein when executed by one or more processors.

Memory 604 can store an operating system 605 and other computer programs 606, such as one or more computer programs/applications that execute to perform aspects described herein. Specifically, programs/applications can include computer readable program instructions that may be configured to carry out functions of embodiments of aspects described herein.

Examples of I/O devices 608 include but are not limited to microphones, speakers, Global Positioning System (GPS) devices, cameras, lights, accelerometers, gyroscopes, magnetometers, sensor devices configured to sense light, proximity, heart rate, body and/or ambient temperature, blood pressure, and/or skin resistance, and activity monitors. An I/O device may be incorporated into the computer system as shown, though in some embodiments an I/O device may be regarded as an external device (612) coupled to the computer system through one or more I/O interfaces 610.

Computer system 600 may communicate with one or more external devices 612 via one or more I/O interfaces 610. Example external devices include a keyboard, a pointing device, a display, and/or any other devices that enable a user to interact with computer system 600. Other example external devices include any device that enables computer system 600 to communicate with one or more other computing systems or peripheral devices such as a printer. A network interface/adapter is an example I/O interface that enables computer system 600 to communicate with one or more networks, such as a local area network (LAN), a general wide area network (WAN), and/or a public network (e.g., the Internet), providing communication with other computing devices or systems, storage devices, or the like. Ethernet-based (such as Wi-Fi) interfaces and Bluetooth® adapters are just examples of the currently available types of network adapters used in computer systems (BLUETOOTH is a registered trademark of Bluetooth SIG, Inc., Kirkland, Wash., U.S.A.).

The communication between I/O interfaces 610 and external devices 612 can occur across wired and/or wireless communications link(s) 611, such as Ethernet-based wired or wireless connections. Example wireless connections include cellular, Wi-Fi, Bluetooth®, proximity-based, near-field, or other types of wireless connections. More generally, communications link(s) 611 may be any appropriate wireless and/or wired communication link(s) for communicating data.

Particular external device(s) 612 may include one or more data storage devices, which may store one or more programs, one or more computer readable program instructions, and/or data, etc. Computer system 600 may include and/or be coupled to and in communication with (e.g. as an external device of the computer system) removable/non-removable, volatile/non-volatile computer system storage media. For example, it may include and/or be coupled to a non-removable, non-volatile magnetic media (typically called a "hard drive"), a magnetic disk drive for reading from and writing to a removable, non-volatile magnetic disk (e.g., a "floppy disk"), and/or an optical disk drive for reading from or writing to a removable, non-volatile optical disk, such as a CD-ROM, DVD-ROM or other optical media.

Computer system 600 may be operational with numerous other general purpose or special purpose computing system environments or configurations. Computer system 600 may take any of various forms, well-known examples of which include, but are not limited to, personal computer (PC) system(s), server computer system(s), such as messaging server(s), thin client(s), thick client(s), workstation(s), laptop(s), handheld device(s), mobile device(s)/computer(s) such as smartphone(s), tablet(s), and wearable device(s), multiprocessor system(s), microprocessor-based system(s), telephony device(s), network appliance(s) (such as edge appliance(s)), virtualization device(s), storage controller(s), set top box(es), programmable consumer electronic(s), network PC(s), minicomputer system(s), mainframe computer system(s), and distributed cloud computing environment(s) that include any of the above systems or devices, and the like.

Aspects described herein may be incorporated into and/or use a cloud computing environment. It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for loadbalancing between clouds).

A cloud computing environment is service oriented with a focus on statelessness, low coupling, modularity, and semantic interoperability. At the heart of cloud computing is an infrastructure comprising a network of interconnected nodes. One such node is node 10 depicted in FIG. 7.

Computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

Figure 7:
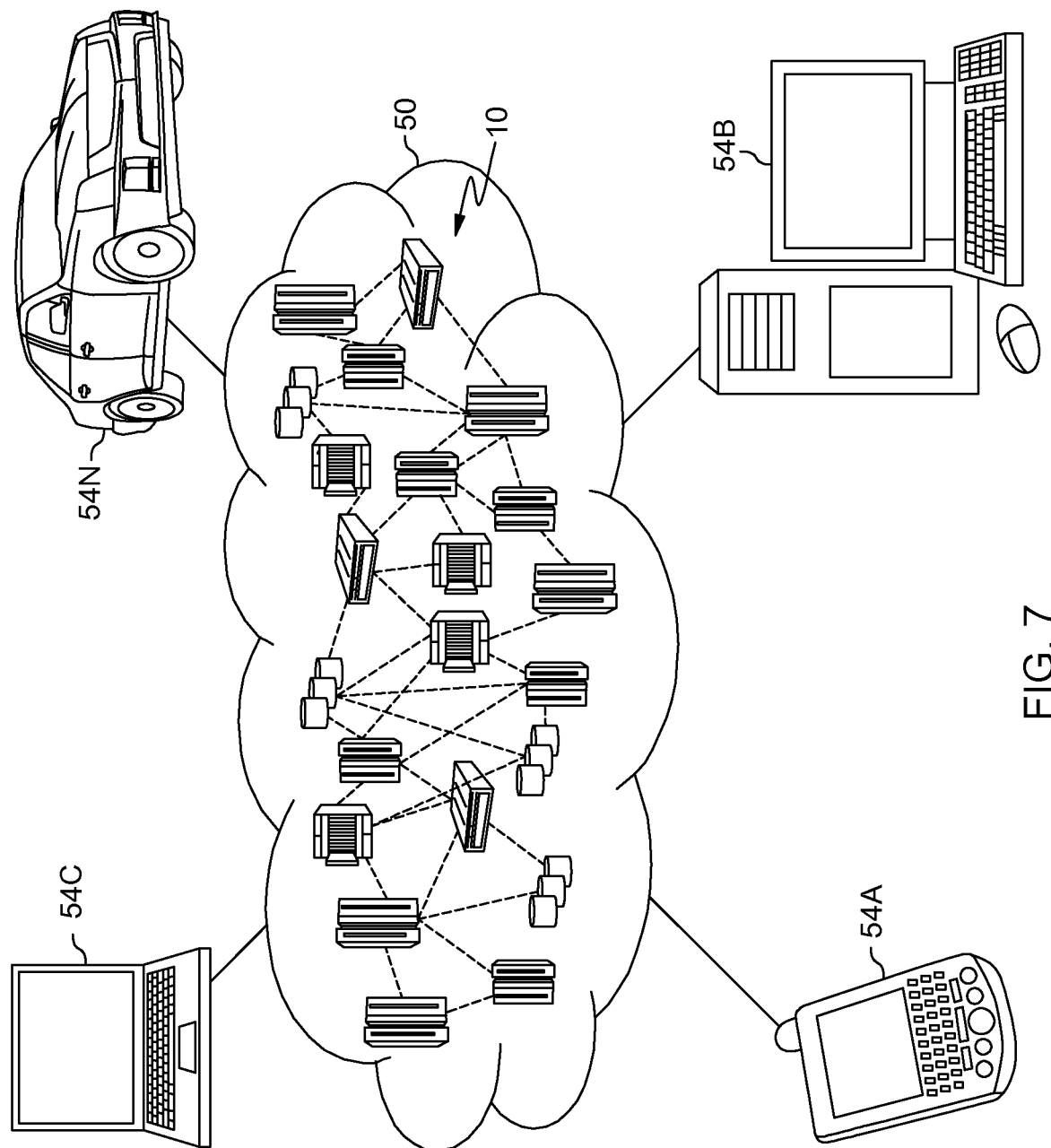
FIG. 7 depicts a cloud computing environment according to an embodiment of the present invention.

Referring now to FIG. 7, illustrative cloud computing environment 50 is depicted. As shown, cloud computing environment 50 comprises one or more computing nodes 10 with which local computing devices used by cloud consumers, such as, for example, smartphone or other mobile device 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 7 are intended to be illustrative only and that computing nodes 10 and cloud computing environment 50 can communicate with any type of computerized device over any type of network and/or network addressable connection (e.g., using a web browser).

Figure 8:
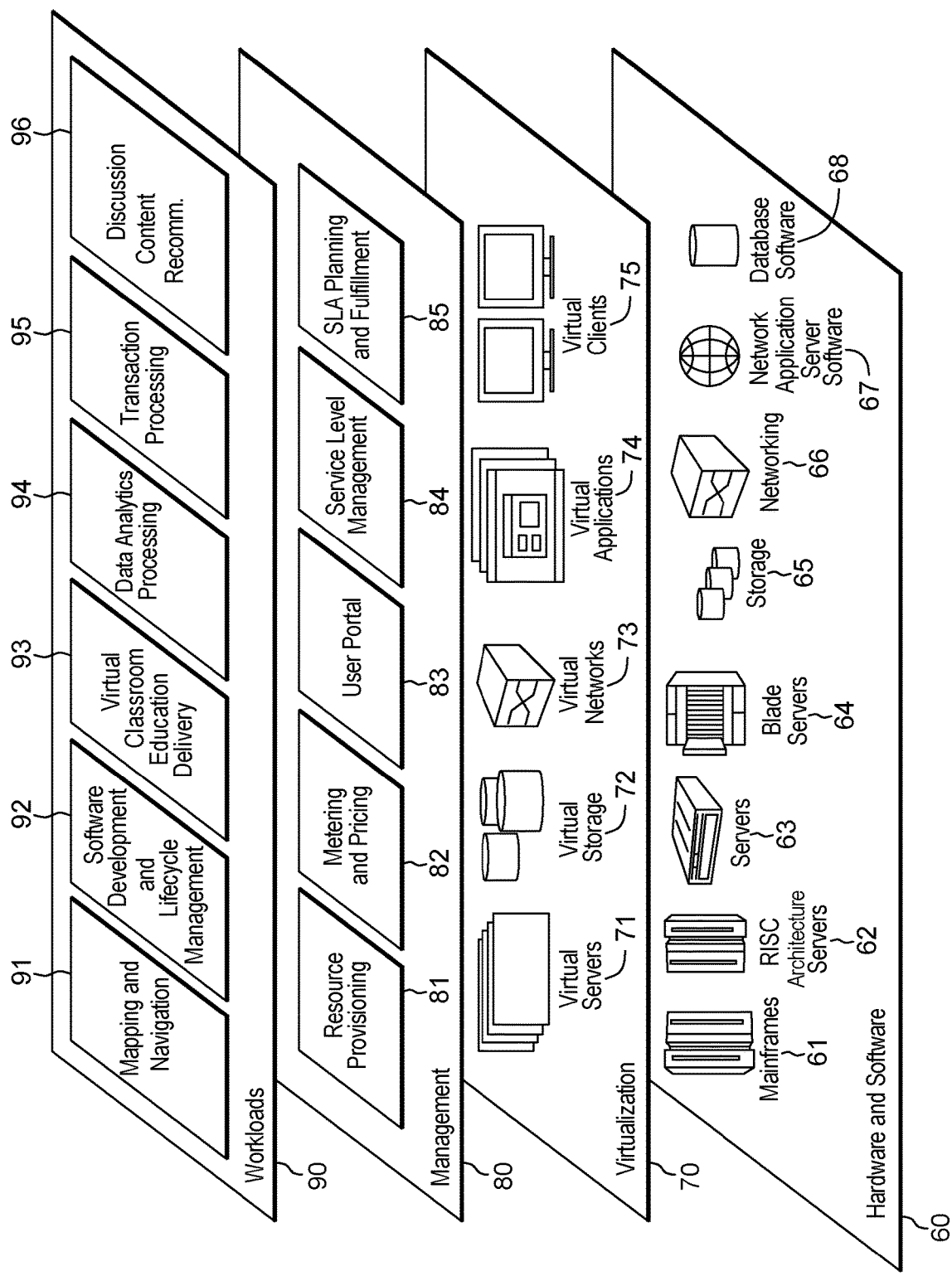
FIG. 8 depicts abstraction model layers according to an embodiment of the present invention.

Referring now to FIG. 8, a set of functional abstraction layers provided by cloud computing environment 50 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 60 includes hardware and software components. Examples of hardware components include mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and discussion content recommendation 96.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In addition to the above, one or more aspects may be provided, offered, deployed, managed, serviced, etc. by a service provider who offers management of customer environments. For instance, the service provider can create, maintain, support, etc. computer code and/or a computer infrastructure that performs one or more aspects for one or more customers. In return, the service provider may receive payment from the customer under a subscription and/or fee agreement, as examples. Additionally or alternatively, the service provider may receive payment from the sale of advertising content to one or more third parties.

In one aspect, an application may be deployed for performing one or more embodiments. As one example, the deploying of an application comprises providing computer infrastructure operable to perform one or more embodiments.

As a further aspect, a computing infrastructure may be deployed comprising integrating computer readable code into a computing system, in which the code in combination with the computing system is capable of performing one or more embodiments.

As yet a further aspect, a process for integrating computing infrastructure comprising integrating computer readable code into a computer system may be provided. The computer system comprises a computer readable medium, in which the computer medium comprises one or more embodiments. The code in combination with the computer system is capable of performing one or more embodiments.

Although various embodiments are described above, these are only examples. For example, computing environments of other architectures can be used to incorporate and use one or more embodiments.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description, but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A computer-implemented method comprising:
   identifying participants in a real-time communication session, the participants including a first user and a second user;
   analyzing digital images of a scene viewable to the first user during the real-time communication session, and extracting image features from the digital images of the scene based on the analyzing, the digital images of the scene depicting the second user during the real-time communication session and the extracted image features relating to the second user;
   accessing a classification of past social media interactions involving the second user and to which the second user has reacted positively;
   determining, for one or more image features of the extracted image features, one or more comments to which the second user is expected to react positively if made by the first user to the second user, the one or more comments determined based on correlating the one or more image features to the classification of past social media interactions to which the second user has reacted positively; and
   providing, during the real-time communication session, the one or more comments as suggestions for the first user to make to the second user, the one or more comments being provided for overlay on a display through which the first user views the scene including the second user.

2. The method of claim 1, wherein the analyzing (i) identifies at least one from the group consisting of: specific objects depicted in the scene and specific places depicted in the scene, and (ii) identifies how those specific objects or specific places relate to the second user, wherein at least some of the extracted image features are the specific objects or specific places.

3. The method of claim 1, further comprising identifying the one or more image features, of the extracted image features, in one or more social media posts of or about the second user and made within a past timeframe, wherein the determined one or more comments refer to a topic of the one or more social media posts.

4. The method of claim 1, further comprising building, based on content analysis of the second user's social network content, a user profile of user reactions that the second user has in response to interactions between that second user and other users within one or more social networks, the user profile providing the classification of past social media interactions to which the second user has reacted positively.

5. The method of claim 4, wherein the content analysis identifies, for the interactions between the second user and the other users within the one or more social networks, (i) which comments of the interactions are made by which of the other users, (ii) relations the second user has with the other users making the comments, (iii) topics of the comments, (iv) vocabulary of the comments, and (v) nature of the comments.

6. The method of claim 5, wherein machine learning is applied to the content analysis and builds a model that identifies how a positive reaction of the second user may be obtained from comments in different contexts, including different topic contexts and from different individuals.

7. The method of claim 5, wherein the machine learning learns how characteristics of other users who interact with the second user are likely to affect whether a specific comment by a specific user evokes a positive reaction from the second user.

8. The method of claim 4, wherein the building ascertains positive reactions of the second user to the interactions based on responses or other reactions posted by the second user in response to the interactions.

9. The method of claim 1, wherein the one or more comments comprise a plurality of comments, and wherein the method further comprises ranking the plurality of comments according to a predicted strength of positive reaction expected by the second user to each of the plurality of comments, and wherein the providing identifies the ranking of the plurality of comments to the first user.

10. The method of claim 1, wherein the one or more comments comprise a plurality of comments, and wherein the method provides the plurality of comments in a sequence which the first user is to follow in making the plurality of comments to the second user, and wherein the sequence is subject to updating based on a flow of discussion of the real-time communication, the updating comprising at least one of the group consisting of: adding a comment to the sequence, removing a comment from the sequence, and rearranging comments within the sequence.

11. The method of claim 1, wherein a timing of the providing the one or more comments is determined based on an ascertained mood of the second user or a discussion flow of the real-time communication session.

12. The method of claim 1, wherein the real-time communication session is an online video chat.

13. The method of claim 1, wherein the real-time communication session is a face-to-face discussion in which the first user and second user participate, the first user using a wearable mobile device comprising (i) a camera that obtains the digital images of the scene and (ii) the display, the display being a transparent display disposed in a line of sight of the first user, the line of sight being from the first user to the second user depicted in the digital images of the scene, and wherein the provided one or more comments are provided for displaying on the display of the wearable mobile device as augmented reality elements in the line of sight of the first user.

14. A computer system comprising:
a memory; and
a processor in communication with the memory, wherein the computer system is configured to perform a method comprising:
identifying participants in a real-time communication session, the participants including a first user and a second user;
analyzing digital images of a scene viewable to the first user during the real-time communication session, and extracting image features from the digital images of the scene based on the analyzing, the digital images of the scene depicting the second user during the real-time communication session and the extracted image features relating to the second user;
accessing a classification of past social media interactions involving the second user and to which the second user has reacted positively;
determining, for one or more image features of the extracted image features, one or more comments to which the second user is expected to react positively if made by the first user to the second user, the one or more comments determined based on correlating the one or more image features to the classification of past social media interactions to which the second user has reacted positively; and
providing, during the real-time communication session, the one or more comments as suggestions for the first user to make to the second user, the one or more comments being provided for overlay on a display through which the first user views the scene including the second user.

15. The computer system of claim 14, wherein the method further comprises identifying the one or more image features, of the extracted image features, in one or more social media posts of or about the second user and made within a past timeframe, wherein the determined one or more comments refer to a topic of the one or more social media posts.

16. The computer system of claim 14, wherein the method further comprises building, based on content analysis of the second user's social network content, a user profile of user reactions that the second user has in response to interactions between that second user and other users within one or more social networks, the user profile providing the classification of past social media interactions to which the second user has reacted positively, wherein the content analysis identifies, for the interactions between the second user and the other users within the one or more social networks, (i) which comments of the interactions are made by which of the other users, (ii) relations the second user has with the other users making the comments, (iii) topics of the comments, (iv) vocabulary of the comments, and (v) nature of the comments, and wherein the machine learning is applied to the content analysis and builds a model that identifies how a positive reaction of the second user may be obtained from comments in different contexts, including different topic contexts and from different individuals.

17. The computer system of claim 14, wherein a timing of the providing the one or more comments is determined based on an ascertained mood of the second user or a discussion flow of the real-time communication session.

18. The computer system of claim 14, wherein the real-time communication session is:
an online video chat; or
a face-to-face discussion in which the first user and second user participate, the first user using a wearable mobile device comprising (i) a camera that obtains the digital images of the scene and (ii) the display, the display being a transparent display disposed in a line of sight of the first user, the line of sight being from the first user to the second user depicted in the digital images of the scene, and wherein the provided one or more comments are provided for displaying on the display of the wearable mobile device as augmented reality elements in the line of sight of the first user.

19. A computer program product comprising:
a non-transitory computer readable storage medium readable by a processing circuit and storing instructions for execution by the processing circuit for performing a method comprising:
identifying participants in a real-time communication session, the participants including a first user and a second user;
analyzing digital images of a scene viewable to the first user during the real-time communication session, and extracting image features from the digital images of the scene based on the analyzing, the digital images of the scene depicting the second user during the real-time communication session and the extracted image features relating to the second user;

accessing a classification of past social media interactions involving the second user and to which the second user has reacted positively;

determining, for one or more image features of the extracted image features, one or more comments to which the second user is expected to react positively if made by the first user to the second user, the one or more comments determined based on correlating the one or more image features to the classification of past social media interactions to which the second user has reacted positively; and providing, during the real-time communication session, the one or more comments as suggestions for the first user to make to the second user, the one or more comments being provided for overlay on a display through which the first user views the scene including the second user.

20. The computer program product of claim 19, wherein the method further comprises identifying the one or more image features, of the extracted image features, in one or more social media posts of or about the second user and made within a past timeframe, wherein the determined one or more comments refer to a topic of the one or more social media posts.

* * * * *